United States Patent

Kelsey et al.

[11] Patent Number: 5,459,229
[45] Date of Patent: Oct. 17, 1995

[54] BY PRODUCT STREAM PURIFICATION IN THE PREPARATION OF 1,3-PROPANEDIOL-BASED POLYESTERS

[75] Inventors: Donald R. Kelsey, Fulshear; Charles C.-S. Chou, Houston, both of Tex.

[73] Assignee: Shell Oil Company, Houston, Tex.

[21] Appl. No.: 395,231

[22] Filed: Feb. 27, 1995

[51] Int. Cl.$^6$ .................................................. C08G 63/78
[52] U.S. Cl. ......................... 528/275; 528/272; 528/298; 210/601; 210/620
[58] Field of Search ...................... 528/272, 275, 528/298; 210/601, 620

[56] References Cited

U.S. PATENT DOCUMENTS

| | | | |
|---|---|---|---|
| 4,375,538 | 3/1983 | Cohen et al. | 528/230 |
| 4,611,049 | 9/1986 | Kuratsuji et al. | 528/279 |
| 5,300,332 | 4/1994 | Kawaguchi et al. | 428/34.1 |
| 5,382,624 | 1/1995 | Hotta et al. | 525/10 |

FOREIGN PATENT DOCUMENTS

547553A1  6/1993  European Pat. Off. .

*Primary Examiner*—Samuel A. Acquah

[57] ABSTRACT

A process for preparing a 1,3-propanediol-based polyester comprises contacting an aqueous stream containing acrolein byproduct with a base for a time effective to reduce the acrolein content of the aqueous stream. In a specific embodiment, a poly(propylene terephthalate) preparation process comprises the steps of:

(a) contacting 1,3-propanediol and terephthalic acid at elevated temperature to produce a reaction product mixture comprising a poly(propylene terephthalate) and an aqueous solution comprising acrolein;

(b) removing a major portion of the aqueous solution from said reaction product mixture;

(c) adding a sufficient quantity of a base to the aqueous solution to form a basic solution having a pH greater than about 7.5 and maintaining the basic solution for a time effective to lower the acrolein content thereof;

(d) optionally, diluting the basic solution with water; and (e) optionally, biotreating the dilute basic solution for a time effective to further lower the acrolein content.

The process of the invention provides a polyester byproduct stream containing reduced levels of acrolein.

8 Claims, No Drawings

5,459,229

BY PRODUCT STREAM PURIFICATION IN THE PREPARATION OF 1,3-PROPANEDIOL-BASED POLYESTERS

BACKGROUND OF THE INVENTION

This invention relates to the preparation of poly(propylene terephthalate) ("PPT") and related copolyesters. In a specific aspect, the invention relates to the treatment of a byproduct-containing stream in a PPT preparation process.

The preparation of PPT involves the reaction of terephthalic acid and excess 1,3-propanediol (PDO) at about 250° C. under pressure to form an oligomer and water. The water is then distilled from the PPT. The major by-products of the polymerization reaction, acrolein and allyl alcohol, are contained in solution in the distillate.

Although the amount of these byproducts is low, it would be desirable to further reduce the level of byproducts in the aqueous distillate especially for subsequent activated sludge treatment.

It is therefore an object of the invention to provide a process for preparing a 1,3-propanediol-based polyesters in which the level of acrolein byproduct in the aqueous stream distilled from the product polyester is reduced.

SUMMARY OF THE INVENTION

According to the invention, a process is provided for preparing a 1,3-propanediol-based polyester comprising contacting an aqueous stream containing acrolein byproduct with a base for a time effective to reduce the acrolein content of the aqueous stream. In a specific embodiment, a polyester preparation process comprises the steps of:

(a) contacting 1,3-propanediol and at least one dicarboxylic acid at elevated temperature to produce a reaction product mixture comprising a 1,3-propanediol-based polyester and an aqueous solution of acrolein;

(b) removing a major portion of said aqueous solution from said reaction product mixture;

(c) adding a sufficient quantity of a base to the aqueous solution to form a basic solution having a pH greater than about 7.5 and maintaining the basic solution for a time effective to lower the acrolein content of the aqueous mixture;

(d) optionally, diluting the basic solution with water; and (e) optionally, biotreating the dilute basic solution for a time effective to further lower the acrolein content of the basic solution.

The process of the invention provides a byproduct stream containing reduced levels of acrolein.

DETAILED DESCRIPTION OF THE INVENTION

The invention process involves forming a basic aqueous solution of the acrolein byproduct of the condensation polymerization of 1,3-propanediol and at least one dicarboxylic acid to prepare a 1,3-propanediol-based polyester. In addition to 1,3-propanediol, the polyester reaction product mixture can contain one or more additional diols such as ethylene glycol, 1,4-butanediol, 1,4-cyclohexane dimethanol and neopentyl glycol. Suitable dicarboxylic acids include, for example, terephthalic acid, isophthalic acid and 2,6-naphthalene dicarboxylic acid. The polyester and copolyester condensation products of such diol and diacid monomers are referred to herein as 1,3-propanediol-based polyesters or PDO-based polyesters.

Water-soluble byproducts are found in the aqueous stream distilled from the PDO-based polyester reaction product mixture. The amount of typical byproducts in the aqueous distillate will generally be within the range of about 100 to about 2500 ppm acrolein, 0.1 to 5 weight percent allyl alcohol and 0.1 to 10 weight percent PDO, based on the weight of the distillate.

The invention process involves addition of a base to the aqueous byproduct solution. The base is preferably an inorganic base, most preferably selected from alkali and alkaline earth metal hydroxides, including lithium hydroxide, sodium hydroxide, potassium hydroxide, magnesium hydroxide and calcium hydroxide, and the corresponding carbonates and bicarbonates. The preferred base, because of its cost and effectiveness, is sodium hydroxide.

The amount of base added to the aqueous byproduct solution is that which is sufficient to impart a pH (25° C.) of the aqueous solution of greater than about 7.5, preferably greater than about 8, most preferably greater than about 10. For the preferred inorganic bases such as alkali and alkaline earth hydroxides, carbonates and bicarbonates, the amount added will typically be such that the weight ratio of base:acrolein is within the range of about 0.01 to about 20, preferably about 0.1 to about 10, most preferably about 0.2 to about 5. For a typical concentration of acrolein of up to about 2500 ppm, the preferred amount of base will be up to about 2.5% by weight based on the total weight of the aqueous solution, although higher levels of base can be used if desired for faster reaction and if not detrimental to subsequent biotreatment.

The temperature during the base treatment can affect the rate of disappearance of the acrolein and will generally be within the range of about 0° to about 50° C., preferably from about 10° to about 40° C. Temperatures above 50° C., i.e., near or above the boiling point of acrolein, are effective but generally to be avoided since this will increase the evaporation of acrolein. The process is effective at temperatures less than 0° C., but treatment times may be prolonged.

After the addition of the base, the aqueous stream is held in a vessel such as a tank or pipe for a length of time to allow the acrolein to react with the base. The time will typically be from a few minutes to several days and will depend on the amount of base, the temperature, the initial concentration of acrolein and the final concentration of acrolein desired. Generally, treatment times will fall within the range of about 1 to about 100 hours.

After a sufficient treatment time for reduction of the concentration of acrolein in the aqueous solution, the solution may be optionally diluted with additional aqueous fluid such as a second aqueous byproduct stream. The treated aqueous solution can optionally be passed to a biotreatment process. Biotreatment will generally involve contact with activated sludge in an aeration basin at a temperature within the range of about 1° to about 40° C. a dissolved oxygen content within the range of about 0.5 to about 8 mg/l, and a typical dilution ratio of about 10–500:1. It is preferred that treatment with base combined with optional dilution be carried out so as to reduce the concentration of acrolein to less than about 3 ppm, most preferably to less than about 0.3 ppm, prior to any biotreatment.

Other treatment methods such as reverse osmosis, ultrafiltration and adsorption may be used in combination with the invention process.

EXAMPLE 1

Treatment of PPT Byproduct Solution With NaOH

PPT byproduct solution (76.6427 g) was spiked with 0.1247 g acrolein (97%) to bring the acrolein level to about 1950 ppm by GC analysis. Two samples of this water in screw cap vials were treated with caustic. In one vial, 0.0980 g of 1N sodium hydroxide was added to 10.380 g of the solution. In the other, 0.2341 g of 1N sodium hydroxide was added to 10.380 g of the solution. The vials were sealed and allowed to stand at room temperature. The vials were sampled periodically and analyzed by gas chromatography using clean dioxane as a diluent and tetrahydrofuran as an internal standard. The results are shown in Table 1.

EXAMPLE 2

Treatment of PPT Byproduct Solution with NaOH

Treatment of samples of PPT byproduct solution containing 1000 ppm acrolein was carried out essentially as in Example 1. Sodium hydroxide was then added to the solution to bring the concentration of NaOH to 1000 ppm. The initial pH was 12.5. The sample vials were sealed, allowed to stand at room temperature and analyzed periodically for acrolein. Results are shown in Table 1.

EXAMPLE 3

Treatment of Byproduct Solutions With NaOH

A simulated PPT byproduct mixture was prepared by mixing together 0.4809 g allyl alcohol, 2.6063 g 1,3-propanediol and 0.0484 g acrolein and diluting with distilled water to a final solution of 56.2798 g. Two samples of this solution in screw cap vials were treated with caustic. In sample C, 0.0964 g 1N NaOH was added to 9.9768 g solution. In sample D, 0.198 g 1N NaOH was added to 10.2325 g of the solution. The vials were sealed and allowed to stand at room temperature. Results are shown in Table 1.

TABLE 1

| Example | Sample | NaOH | pH | Hours | Acrolein (ppm) |
|---|---|---|---|---|---|
| 1 | Untreated | 0 | | 0 | 1950 |
| | | | | 6 | 2200 |
| | | | | 76 | 1460 |
| | Treated A | 380 | | 1.5 | 380 |
| | | | | 75 | 60 |
| | Treated B | 880 | | 2 | 240 |
| | | | | 7 | 200 |
| 2 | Untreated | 0 | 5.6 | 0 | 1000 |
| | | | 5.5 | 96 | 430 |
| | Treated | 1000 | 12.5 | 1 | 13 |
| | | | | 4 | <1 |
| | | | | 24 | <1 |
| | | | 12.0 | 96 | <1 |
| 3 | Untreated | | | 0 | 890 |
| | | | | 79 | 780 |
| | Treated C | 380 | | 1 | 80 |
| | Treated D | 760 | | 1 | 160 |
| | | | | 76 | ND |

ND = not detected (estimated <10 ppm)

EXAMPLE 4

Treatment Of PPT Byproduct Solution with NaOH/Ethylene Glycol

PPT byproduct solution (70.428 g) was spiked with 0.1690 g acrolein to bring the acrolein level to about 2630 ppm by GC analysis and 6.58 g was transferred to a screw cap vial. To the remaining solution was added approximately 0.3 g 1N sodium hydroxide solution to give a final solution of 64.24 g with a pH of about 10 (sample E). Ethylene glycol was added to portions of sample E to make sample F with about 1.1% ethylene glycol and sample G with about 10% ethylene glycol. The sealed samples were allowed to stand at room temperature and were analyzed by GC. The results are shown in Table 2.

The presence of added ethylene glycol does not appear to affect the results. The samples treated with sodium hydroxide show lower levels of acrolein than the untreated sample. Note that the concentration of base was lower and the initial concentration of acrolein somewhat higher than in Example 1.

TABLE 2

| Sample | NaOH | Hours | Acrolein Conc. (ppm) |
|---|---|---|---|
| Untreated | 0 | 1 | 2630 |
| | | 25 | 2260 |
| | | 120 | 1520 |
| Treated E | ~190 | 2 | 280 |
| | | 7 | 310 |
| | | 22 | 260 |
| | | 120 | 250 |
| Treated F | ~190 | 3 | 280 |
| Treated G | ~170 | 3 | 450 |

EXAMPLE 5

Treatment of PPT Byproduct Solutions with Acid

For comparison, PPT byproduct solution (53.1842 g) was spiked with 0.090 g acrolein to bring the acrolein level to about 2610 ppm. Three samples were prepared from this solution. Sample H containing 10.1576 g wastewater with 0.512 g 0.1N hydrochloric acid (final pH 3). Sample I contained 9.5485 g byproduct solution with 0.5212 g 0.1N HCl and 0.1063 g ethylene glycol. Sample J contained 9.4565 g byproduct solution with 0.4976 g 0.1N HCl and 0.5092 g ethylene glycol. The sealed vials were allowed to stand at room temperature and analyzed by GC. Results are shown in Table 3. The acid treatment, with or without added glycol, had relatively little effect on the concentration of acrolein.

TABLE 3

| Sample | Hours | Acrolein Conc. (ppm) |
|---|---|---|
| Untreated | 0 | 2610 |
| | 24 | 2120 |
| Sample H | 1 | 1970 |
| | 4 | 1910 |
| | 25 | 1740 |
| Sample I | 1 | 1960 |
| | 4 | 1800 |
| | 25 | 1700 |
| Sample J | 1 | 1870 |
| | 5 | 1730 |
| | 25 | 1550 |

EXAMPLE 6

Treatment of Byproduct Solution at Lower Temperature

Similar to the process described in Example 3, a simulated PPT byproduct solution was prepared by mixing together 0.41 g allyl alcohol, 2.75 g 1,3-propanediol and 0.052 g acrolein and diluting with 51.69 g distilled water. To test the invention process under low-temperature conditions, the solution was cooled to about 1° C. Samples of the solution in screw cap vials were tested with caustic. In sample K, 0.12 g 1N NaOH was mixed with 10.304 g of solution. In sample L, 0.266 g 1N NaOH was mixed with 9.760 g of solution. In Sample M, 0.504 g 1N NaOH was mixed with 9.989 g of solution. The vials were capped and stored at about 1° C. in a refrigerator. Results are shown in Table 4.

TABLE 4

| Sample | NaOH (ppm) | pH | Hours | Acrolein Conc. (ppm) |
|---|---|---|---|---|
| Untreated |  | 4.5–5 | 0 | 1120 |
|  |  |  | 25 | 1110 |
|  |  |  | 49 | 1060 |
| Treated K | 460 | 10.5–11 | 2 | 230 |
|  |  |  | 24 | 130 |
|  |  |  | 48 | 110 |
| Treated L | 1060 | 11.5–12 | 2 | 260 |
|  |  |  | 24 | 130 |
|  |  |  | 48 | 100 |
| Treated M | 1920 | 12–12.5 | 2 | 170 |
|  |  |  | 25 | 130 |
|  |  |  | 48 | 120 |

EXAMPLE 7

Effect of Alkali Pretreatment on Byproduct Solution Biotreatability

Respirometric tests were conducted to compare the oxygen utilization rates of activated sludge or biomass under various feed conditions. The oxygen utilization rate is a direct measurement of the microbial consumption rate of the waste materials. The activated sludge was taken from a chemical manufacturing plant where polyester (PET) based on ethylene glycol is produced. A byproduct solution from the synthesis of polypropylene terephthalate (PPT) containing 1000 ppm acrolein was treated with sodium hydroxide as described above in Example 2 and used as a feed. The byproduct solution from the PET plant was used as a standard feed for comparison. Acrolein was added at various levels to the PET solution to show whether it had any adverse effect on oxygen uptake rates. The results of a typical test are summarized in Table 5. Oxygen uptake rates are in milliliters of oxygen at 20° C. and 1 atmosphere pressure.

The PPT solution treated with caustic did not affect the oxygen uptake rate, while 5 to 15 ppm of acrolein reduced the rate by 29–52% in 12 hours and 34–65% in 28 hours.

These results indicate that the caustic treatment removed the inhibitory effect of the acrolein in the PPT byproduct solution and that the organic products formed in the caustic treatment were nontoxic to the biomass.

TABLE 5

| Feed Source | Oxygen Uptake at 12 Hours[a] | Oxygen Uptake at 28 Hours |
|---|---|---|
| Endonenous (no feed) | 14 | 26 |
| PET plant byproduct stream | 85 | 250 |
| PET plant byproduct + caustic PPT byproduct stream (3% of total COD) | 82 | 255 |
| PET byproduct stream + 5 ppm acrolein (0.3% of total COD) | 60 | 168 |
| PET byproduct stream + 15 ppm acrolein (0.9% of total COD) | 41 | 88 |

COD = Chemical Oxygen Demand
[a]Millimeters $O_2$ at 20° C., 1 atm.

We claim:

1. In a process in which at least one dicarboxylic acid and 1,3-propanediol are contacted at elevated temperature to produce an aqueous product mixture comprising a 1,3-propanediol-based polyester and an aqueous solution of acrolein, the improvement which comprises:

(a) removing a major portion of said aqueous solution from said aqueous product mixture;

(b) adding to the aqueous solution an amount of a base effective to form a basic solution having a pH greater than about 7.5; and (c) maintaining the basic solution for a time effective to reduce the amount of acrolein therein.

2. The process of claim 1 in which said basic solution has a pH greater than about 10.

3. The process of claim 1 in which the base is selected from alkali and alkaline earth metal hydroxides, carbonates and bicarbonates.

4. The process of claim 3 in which the base is selected from sodium hydroxide and potassium hydroxide.

5. The process of claim 1 in which the temperature of the basic solution of step (c) is within the range of about 0° to about 50° C.

6. The process of claim 1 in which step (c) is carried out over a time within the range of about 1 to about 100 hours.

7. The process of claim 1 which further comprises:

(d) adding an aqueous liquid to the basic solution to form a dilute solution containing less than about 3 ppm acrolein and (e) subjecting the dilute basic solution to biological treatment for a time effective to further reduce the level of acrolein therein.

8. The process of claim 1 in which the dicarboxylic acid is selected from at least one of terephthalic acid, isophthalic acid and 2,6-naphthalene dicarboxylic acid.

* * * * *